United States Patent [19]

Flanders et al.

[11] Patent Number: 5,572,193
[45] Date of Patent: *Nov. 5, 1996

[54] METHOD FOR AUTHENTICATION AND PROTECTION OF SUBSCRIBERS IN TELECOMMUNICATIONS SYSTEMS

[75] Inventors: Mary B. Flanders, Louisville, Colo.; Louis D. Finkelstein, Wheeling; Larry C. Puhl, Sleepy Hollow, both of Ill.

[73] Assignee: Motorola, Inc., Schaumburg, Ill.

[*] Notice: The term of this patent shall not extend beyond the expiration date of Pat. No. 5,239,294.

[21] Appl. No.: 295,173

[22] Filed: Aug. 22, 1994

Related U.S. Application Data

[63] Continuation of Ser. No. 50,952, Apr. 21, 1993, abandoned, which is a continuation of Ser. No. 626,227, Dec. 7, 1990, Pat. No. 5,239,294.

[51] Int. Cl.⁶ ........................................ H04Q 1/00
[52] U.S. Cl. ....................... 340/825.34; 340/825.31; 340/825.44; 70/62; 70/63; 380/43
[58] Field of Search ................ 340/825.31, 825.34, 340/825.44; 379/62, 63; 380/43, 46, 49

[56] References Cited

U.S. PATENT DOCUMENTS

| | | |
|---|---|---|
| 4,023,012 | 5/1977 | Ano . |
| 4,023,013 | 5/1977 | Kinker . |
| 4,048,475 | 9/1977 | Yoshida . |
| 4,315,101 | 2/1982 | Atalla . |
| 4,535,333 | 8/1985 | Twardowski . |
| 4,596,985 | 6/1986 | Bongard .......................... 340/825.34 |
| 4,630,201 | 12/1986 | White ............................. 340/825.34 |
| 4,672,533 | 6/1987 | Noble et al. .................... 340/825.34 |
| 4,761,808 | 8/1988 | Howard ................................ 379/95 |
| 4,814,741 | 3/1989 | Hongo et al. . |
| 4,992,783 | 2/1991 | Zdunek et al. . |
| 5,023,908 | 6/1991 | Weiss . |
| 5,060,266 | 10/1991 | Dent . |
| 5,081,679 | 1/1992 | Dent . |
| 5,091,942 | 2/1992 | Dent . |
| 5,239,294 | 8/1993 | Flanders et al. ............... 340/825.34 |

FOREIGN PATENT DOCUMENTS

| | | |
|---|---|---|
| 0447380A1 | 9/1991 | European Pat. Off. . |
| 3439120 | 8/1986 | Germany . |
| 92/02089 | 7/1990 | WIPO . |

OTHER PUBLICATIONS

Electronic Industries Association Standard 553 (EIA-533), "Mobile Station-Land Station Compatibility Specification".

(List continued on next page.)

*Primary Examiner*—Brian Zimmerman
*Attorney, Agent, or Firm*—Jeffrey G. Toler; Kevin A. Buford

[57] ABSTRACT

A method and apparatus for authentication between a subscriber unit and a communication unit is provided. The authentication process includes: maintaining an historic non-arbitrary value in the subscriber unit, generating an authentication message in the subscriber unit as a function of at least part of the historic non-arbitrary value, and transmitting the authentication message to the communication unit. In addition, the authentication process includes: receiving an authentication message at a communication unit, maintaining an historic non-arbitrary value in the communication unit, and determining, in the communication unit, through the use of the received authentication message and the maintained historic non-arbitrary value, whether a received service request is authentic. In another embodiment, the authentication process includes: providing the subscriber unit with at least part of a plurality of dialed digits which uniquely identify a target communication unit, generating an authentication message in the subscriber unit as a function of the at least part of the plurality of dialed digits, and transmitting the authentication message and the at least part of the plurality of dialed digits from the subscriber unit to the communication unit. In addition the other embodiment authentication process includes: receiving an authentication message and at least part of a plurality of dialed digits which uniquely identifies a target communication unit, the authentication message being derived from the received dialed digits, and determining in the communication unit, through the use of the received authentication message and the received dialed digits, whether a received service request is authentic.

44 Claims, 3 Drawing Sheets

OTHER PUBLICATIONS

European Groupe Special Mobile Recommendation–GSM 2.09 "Security Aspects", Version 3.0.0., Released Feb. 15, 1988.

European Groupe Special Mobile Recommendation–GSM 2.17 "Subscriber Identity Modules, Functional Characteristics", version 3.0.0, Issued Oct. 1988.

European Groupe Special Mobile Recommendation–GSM 3.20 "Security Related Network Functions", version 3.2.0, Released Apr. 15, 1989.

European Groupe Special Recommendation–GSM 12.03 "Security Management", version 3.0.0, Dated Nov. 15, 1988.

TIA Technical Subcommittee, TR 45.3 Digital Cellular Standards, "Proposals for Authentication", Jul. 23–27, 1990.

TIA Technical Subcommittee, TR. 45.3 Digital Cellular Standards, "Implementation of User Speech and Data Privacy", Jul. 23–, 1990.

"Definition on Key Generation Algorithm", presented in Salt Lake City, Utah, TIA Technical Subcommittee, TR 45.3 Digital Cellular Standards Committee.

"Definition of Authentication Algorithm", presented in Salt Lake City, Utah, TIA Technical Subcommittee, TR 45.3 Digital Cellular Standards Committee.

METHOD FOR AUTHENTICATION AND PROTECTION OF SUBSCRIBERS IN TELECOMMUNICATIONS SYSTEMS

CROSS REFERENCE TO RELATED APPLICATION

This is a continuation of U.S. patent application Ser. No. 08/050,952 filed Apr. 21 1993, which is now abandoned; which is a continuation of U.S. patent application Ser. No. 07/626,227 filed Dec. 7, 1990 which is now U.S. Pat. No. 5,239,294. U.S. Pat. No. 4,992,783, filed Apr. 4, 1988 entitled "Method and Apparatus for Controlling Access to a Communication System" by inventors Zdunek et al. and assigned to the instant assignee, Motorola Inc., is directed to the use of arbitrary data—i.e., a generated random password that is periodically incremented/decremented.

TECHNICAL FIELD

This invention relates generally to communication systems and more particularly to radio frequency (RF) cellular telecommunication systems.

BACKGROUND OF THE INVENTION

Cellular radio telephone systems typically include subscriber units (such as mobile or portable units) which communicate with a fixed network communication unit via RF transmissions. A typical fixed communication network includes at least a base station and a switching center. One responsibility of the fixed network communication unit is to grant use of the communication system to the subscriber unit after the requesting subscriber unit meets the authentication requirements of the system. In a typical cellular telephone communication system, each subscriber unit is assigned a telephone number (mobile identification number) (MIN) and an identification number (or serial number) (SN) which uniquely identifies the subscriber to any fixed network communication unit. Each subscriber unit has a unique identification number that distinguishes it from other subscriber units. The fixed network communication unit has access to these identification network communication unit has access to these identification numbers through a database. Often these numbers are used by the fixed network communication units to bill subscribers for the time the subscriber uses the system. When the subscriber calls another unit, he enters the phone number he wishes to call. The dialed phone number becomes the data to be sent to the fixed network communication unit. Data may also include other information regarding a third communication unit such as a unit's location.

Detection of a legitimate subscriber's identification number may be accomplished by RF eavesdropping or by purposeful or inadvertent divulgence of the MIN/SN combination by the radio telephone installer. Once the subscriber's telephone number and identification number is known (stolen), a thief may reprogram another subscriber unit with the stolen identification number causing two or more subscriber units to have: the same MIN/SN combination. Cellular radio telephone systems have authentication procedures to deny access to subscribers not having legitimate identification numbers, but do not have the capability to detect multiple users or effectively neutralize the effect of an installer leaking subscriber identification numbers. Therefore, the legitimate user is billed for both the thief's use and his own use.

Several authentication techniques are known. EIA-553 section 2.3 specifies that each subscriber shall have a MIN and a factory set SN. The telephone number which the subscriber is attempting to contact is the data that is transmitted by the subscriber to the fixed network communication unit. Authentication is granted by this system if the MIN and corresponding SN are found in the fixed network communication unit database. Unfortunately, EIA-553 does not require the encipherment of the MIN or SN before transmission to the fixed network communication unit thereby permitting direct RF detection of any MIN or SN. In addition, this technique fails to provide protection against a thief that acquires a MIN/SN from an installer.

Another authentication technique is described in European cellular communication system recommendations generated by the Groupe Special Mobile (GSM); see sections: 02.09, 02.17, 03.20, and 12.03. This method additionally requires the subscriber to openly transmit a temporary mobile subscriber ID (TMSI) to the fixed network communication unit; the fixed network communication unit generates and sends a random number (RAND) to the subscriber. The enciphering technique requires the subscriber unit to autonomously retrieve at least three enciphering elements from its memory: a predetermined ciphering key, an SN (individual subscriber authentication key) and a MIN (international mobile subscriber identification number—IMSI). The subscriber then enciphers its SN and MIN using the cipher to construct the RAND into a signed response (SRES). The subscriber unit transmits this signed response back to the fixed network communication unit where the fixed network communication unit checks the SN, MIN, and ciphering key against its database using the subscriber's temporary ID (TMSI).

The fixed network communication unit generates its response to the same random number using the information retrieved from the database and compares the subscriber signed response to the fixed network communication unit generated response. If the responses are substantially equivalent, authentication is confirmed. The dialed telephone number is only allowed to be transmitted after authentication is granted. This system affords some protection against a thief that acquires the MIN/SN from an installer by enciphering the SN and reassigning a temporary TMSI each time the subscriber enters a different cell area.

Although one technique enciphers the subscriber's serial number before transmission, neither system detects multiple users. Detection of thieves once they acquire access is important to maintaining a secure system. Moreover, the random number transmission (required for encipherment) necessitates additional communication between the subscriber unit and the fixed network communication unit each time a call is made which increases the probability of transmission error and adds a transmission step to the fixed network communication unit's authentication protocol routine. In addition, authentication must be verified before the system will allow data to be accepted. Therefore data must be sent after the steps of the authentication procedure are complete.

There exists a need for a substantially enhanced authentication technique for a cellular telecommunication system that detects fraudulent users and efficiently protects identification numbers from unauthorized detection. The authentication method should restrict an illegitimate user's capacity to utilize the system in the case where access is inadvertently granted. Further, an adequate level of security resulting from encipherment should not require additional transmission processes or inject higher error levels during the authentication process.

BRIEF SUMMARY OF THE INVENTION

These needs and others are substantially met through provision of the method for authentication and protection of subscribers in telecommunication systems disclosed below. This method describes an authentication technique for use between a first communication unit, such as a subscriber unit, and a second communication unit, such as a fixed network communication unit, wherein the first communication unit modifies an ID, known to both the first communication unit and the second communication unit (such as a serial number), using data as one enciphering key and a second ID (such as a Personal Identification Number—PIN) as the other enciphering key. An historic non-arbitrary value of predetermined communication events, such as a count of the number of telephone calls made by a subscriber, is maintained in both the first and second communication units. This value (count) is historic because it represents past telephone calls attributed to a communication unit, and it is non-arbitrary because this history of transactions (i.e., number of calls made) serves to identify an out-of-sync communication unit.

The first communication unit transmits (via RF signals) the modified ID and count to a second communication unit. The second communication unit compares the count maintained by the first communication unit to the count maintained by the second unit. A count discrepancy indicates a different number of calls on one unit indicating a multiple user whose count is out of sequence. The second communication unit performs the same enciphering method on the known serial number using the data received and a known second ID. The second communication unit compares the received modified serial number and the serial number generated by the fixed network communication unit to determine if the serial number is valid. The invention is designed to substantially decrease unauthorized use of a first ID of a communication unit. The authentication method does not require the second ID to ever be transmitted by RF.

This invention provides a means for detecting multiple subscribers using the same serial numbers and telephone numbers. Moreover, if a multiple user copies the information transmitted and uses the same information to access the system, the multiple user will be limited to only calling the telephone number that is in the authentication message; not a telephone number of his own choice. This authentication invention also reduces authentication errors by making more efficient use of the data transmitted and a second ID, by using them as a part of the cipher; the enciphering means does not require an additional RAND stream to be sent by a fixed network communication unit to be used as the common enciphering base and thereby eliminates this additional transmission and therefore decreases the probability of errors.

BEST MODE Of OPERATION

Figure 1:
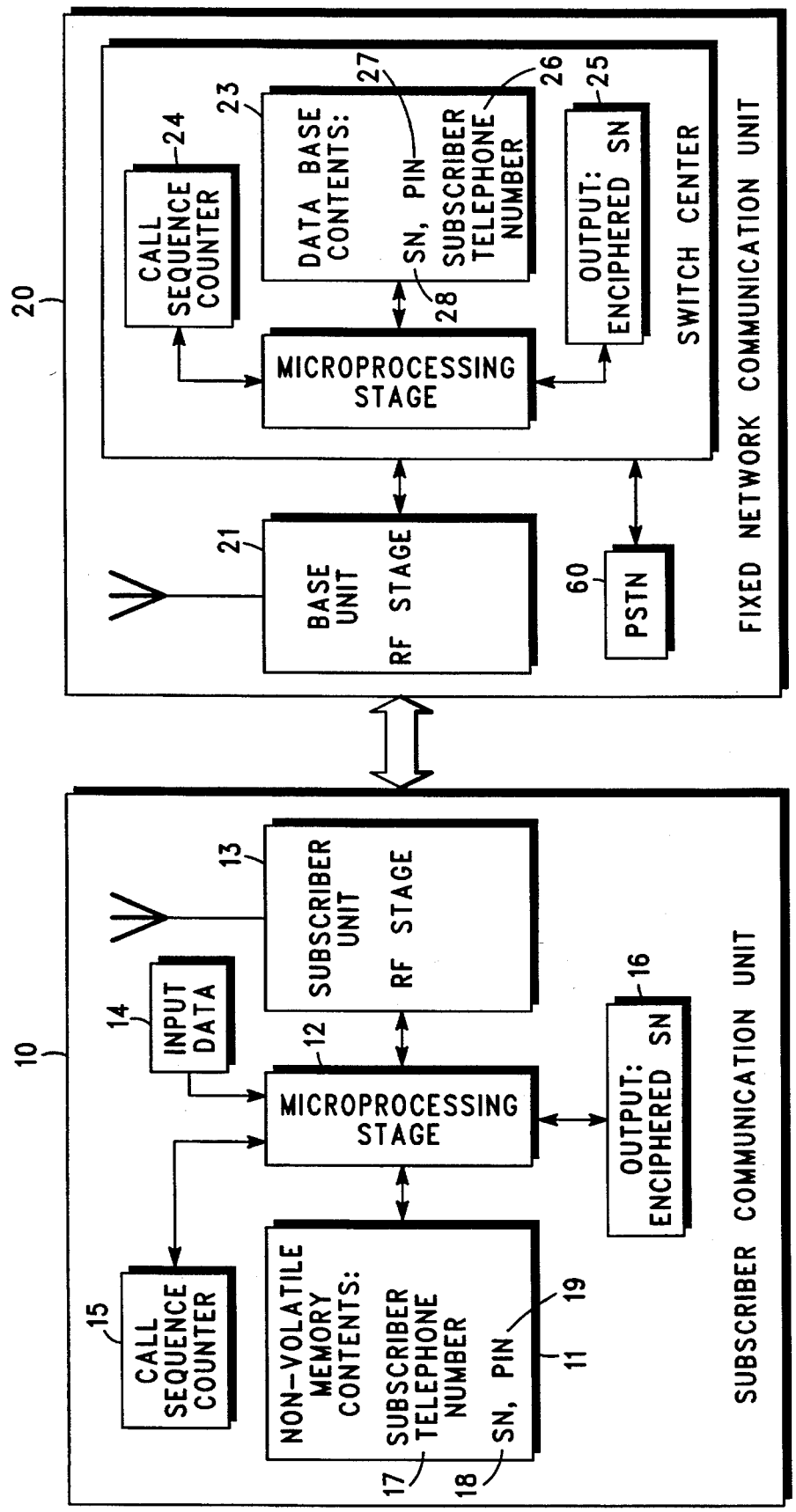
FIG. 1 is a block diagram of a typical subscriber communication unit and fixed network communication unit.

FIG. 1 generally depicts a subscriber communication unit (10) such as a subscriber telephone and a fixed network communication unit (20) such as a cellular telephone basesite and switching center. The subscriber communication unit (10) is comprised of a microprocessing stage (12), a non-volatile memory unit (11), a radio frequency (RF) stage (13), all as well understood in the art. Additional elements include a data input stage (14) such as a key entry pad on a telephone (to enter a telephone number—data), a subscriber call sequence counter (15), and an output from an enciphering stage referred to as the enciphered serial number (16).

Within the non-volatile memory unit (11) resides the serial number (18) (for the subscriber unit), the PIN (19), and the subscriber telephone number (17) (which can have, for example, characteristics of a Mobile Identification Number (MIN)). The PIN is a second ID known only to the subscriber unit and the fixed network unit. For example, it should not be available to an installer of the subscriber unit, it should only be available to a legitimate user of a subscriber unit and a fixed network communication unit database. The subscriber need only enter the PIN one time to activate it. The PIN may be changed by the subscriber, but the change must also be made known to the fixed network unit. These identifiers need not necessarily be numbers but may correspond to any attribute capable of being identified by the fixed network communications unit. An alternative embodiment, for example, in a cellular system, may include a stored look up table containing multiple sets of serial numbers, PIN's, and telephone numbers with each set of identifiers corresponding to a specific cellular area or fixed network communication unit.

The fixed network communication unit (20) includes a switching center which is comprised of a microprocessing stage (22), a database (23), and a link to a basesite radio frequency stage (21), all as well understood in the art. Additional elements include a fixed network unit call sequence counter (24) and an enciphered serial number generated by the fixed network unit (25).

The database includes information regarding the subscriber unit's: serial number (28), PIN (27), and subscriber telephone number (26); the information is a copy of these ID's. The serial number (18), PIN (19), and telephone number (17) of the subscriber communication unit (10) correspond to the serial number (28), PIN (27), and telephone number (26) as stored in the fixed network communication unit (20). Communication between the subscriber communication unit (10) and the fixed network communication unit (20) is accomplished via RF transmissions between the two units in accordance with well understood cellular system techniques.

Figure 2:
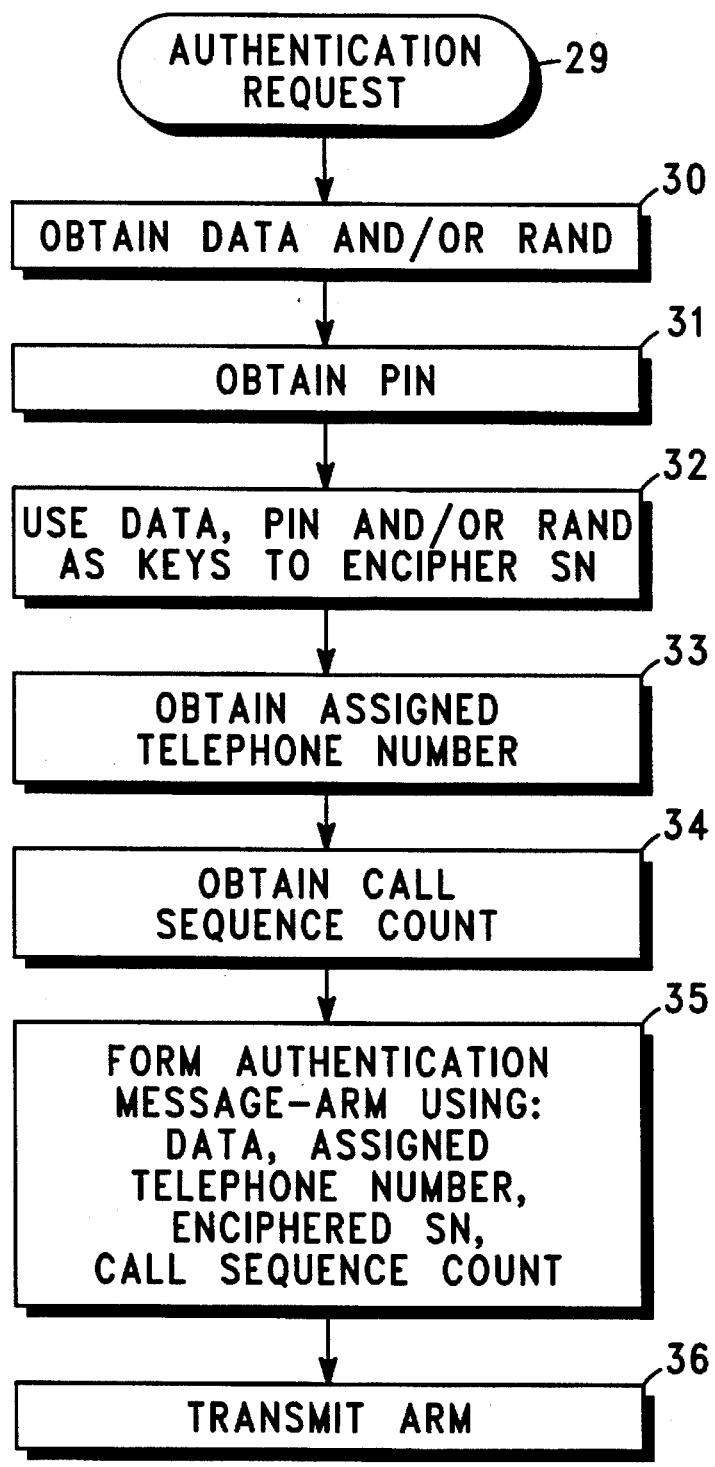
FIG. 2 is a flow chart of the identification enciphering method used by a subscriber communication unit.

When authentication is required of the subscriber communication unit (10), the subscriber unit enciphers its serial number (18) and increments its call sequence counter (15). FIG. 2 depicts the method used by a subscriber communication unit to encipher its serial number before transmission to a fixed network communication unit during an authentication request (29). This method requires use of two enciphering keys. The subscriber unit obtains the called telephone number (data)(30) and obtains PIN (31) from memory and uses at least parts of these two components as the enciphering keys to encipher its serial number (32). If PIN and the called telephone number are comprised of bits, the parts of s these keys to be used are the contents of the bits and the bit length of each key. For example, an enciphered serial number may have a different bit length than the unenciphered serial number, or unmodified first ID, depending on the contents of the PIN or the data. Varying the enciphered SN bit length may also be a function of another event known to both the subscriber and fixed network unit such as the time of day.

The algorithm to integrate the two enciphering keys may be varied to accommodate various levels of security depending upon the requirement of the system. The subscriber identification enciphering method does not require authentication to be confirmed by the fixed network communication unit before data is transmitted. Combining PIN with data adds the ability of the system to encipher a serial number into a complex code to an extent sufficient to substantially eliminate unauthorized detection by RF eavesdropping and unauthorized divulgence by installers.

The modified serial number (enciphered SN) becomes a component of the Authentication Request Message (ARM) (35) that is transmitted via RF (36) to the fixed network communication unit. Once encipherment is complete, the assigned telephone number is obtained (33) from memory. This number is not enciphered as part of the authentication procedure. This identifier is a component of the ARM (35) that informs the fixed network unit that the authentication request is coming from a valid subscriber unit.

The call sequence count is then obtained (34) and also used in the ARM (35). The call sequence count is updated (incremented or decremented) each time a predetermined event occurs such as when the authentication procedure is initiated or a call is completed. The count may be maintained by the subscriber and fixed network unit using a rollover type counter such as a ring counter. This count is used by the fixed network communication unit as a means to count the number of calls made by each subscriber. Because a record of the number of calls made by each subscriber is maintained by both the subscriber unit and the fixed network communication unit, another subscriber trying to use the same serial number will be detected because it will not have made the exact same number of calls as the legitimate subscriber. The call sequence count information is communicated to the fixed network unit as one component of the Authentication Request Message. The ARM can be communicated in any acceptable format or in any number of stages. Components of a typical ARM (35) include data, the enciphered serial number, the call sequence count, and the assigned telephone number. An alternative embodiment would include modifying the call sequence count using the same enciphering method that is used to modify the SN. This would further enhance the protection because the count is also disguised using the PIN and data; each subscriber would generate a different value for the same count (number of calls made).

Figure 3:
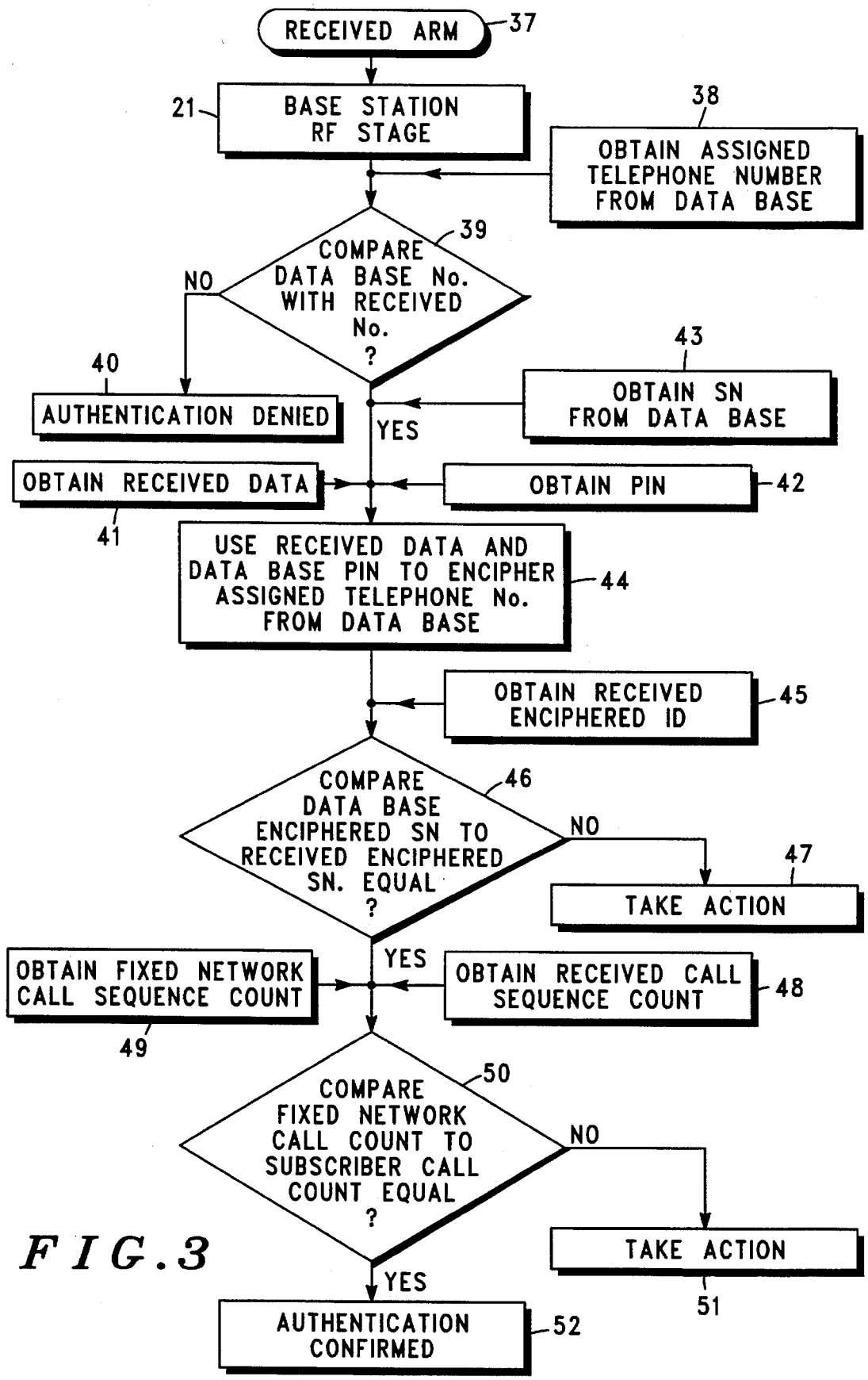
FIG. 3 is a flow chart of the authentication method used by a fixed network communication unit in accordance with the invention.

A fixed network communication unit receives a transmitted ARM and uses this information to determine whether authentication should be granted to the subscriber unit. FIG. 3 depicts the authentication method performed by a fixed network unit. The ARM is received (37) by the fixed network unit by means of the base RF unit (21). The fixed network unit has access to assigned telephone number's, serial number's and PIN's of valid subscriber units through its database. The fixed network unit determines if the assigned telephone number received in the ARM is valid (39) by obtaining from the fixed network unit database the same assigned telephone number (38). A comparison is made between the received telephone number from the subscriber unit and the valid number found in the database (39). If the assigned telephone number is not recognized by the fixed network unit, authentication is denied (or some other action taken) (40).

If the assigned telephone number is determined to be valid (it is found in the database), the fixed network unit then retrieves from the database the serial number and PIN corresponding to that particular assigned telephone number. The fixed network unit then, uses the PIN from the database and the data received in the ARM as enciphering keys as elements of its enciphering method (44), which is the same method used in the subscriber unit, and generates its own enciphered serial number. The fixed network unit compares this enciphered serial number to the serial number enciphered by the subscriber unit (46). If they are not substantially the same, then the system denies access or takes some other predetermined course of action (47). If they are within the acceptable tolerance, the received call sequence count is obtained (48) and compared (50) to the call count maintained by the fixed network communication unit (49). If the counts are substantially equal, authentication may be confirmed (52) which is the first predetermined course of action. At this point, the subscriber may be allowed to communicate with the third communication unit associated with the dialed number. This third unit may more generally be termed a requested communication resource. If the count is not within the acceptable tolerance, authentication may be denied or the authorities may be notified that a multiple user is attempting to access the system (51).

The fixed network unit call counter maintains the number of times authentication is granted to a subscriber. Each subscriber has its own call counter. Having a continuous call counting scheme between a subscriber and a fixed network communication unit prevents another subscriber from using some other subscriber's identification number because the thief would not have made the identical number of calls that the legitimate subscriber made. This discrepancy is flagged by the fixed network unit when it compares the two counts.

Protection against illegitimate users is further enhanced by the encipherment method's use of the enciphered dialed telephone number and the PIN (which is not transmitted). Without an illegitimate user knowing a subscriber's PIN and the exact algorithm that, enciphers the serial number, a thief is limited to merely copying the authentication message of a subscriber and repeating this message. Each time a subscriber dials a different telephone number, a different authentication request message is generated because each subscriber has a different PIN; each subscriber generates a different authentication request message for the same telephone number.

Although a thief may detect the call sequence count (because it is not enciphered in the ARM) and update it, a correct count would only allow the thief to gain authentication for the enciphered dialed telephone number he intercepted. Therefore the illegitimate user can only communicate to the subscriber whose enciphered telephone number matches that copied from the ARM.

An alternative embodiment comprising the call sequence count may allow each subscriber to maintain more than one call counter where a separate call counter is required for each fixed network communication unit. This embodiment would find use in a cellular communication system which allowed a subscriber to use multiple fixed network communication units. Another alternative embodiment to the flow in FIG. 3 may require the step of comparing the call sequence counts (50) to occur before the step involving the comparison of enciphered serial numbers (46).

What we claim is:

1. A communication unit which authenticates communications with a subscriber unit of a communication system, comprising:

(a) receiver means for receiving an authentication message;

(b) memory means for maintaining a non-arbitrary value which is a count of occurrences of a communication event; and (c) processor means for determining, through the use of the received authentication message and the maintained non-arbitrary value, whether a received service request is authentic.

2. The communication unit of claim 1 wherein the non-arbitrary value comprises a record of pseudo random communication events associated with the subscriber unit selected from the group consisting essentially of the number of telephone calls attributed to the subscriber unit, the number of channel handoffs attributed to the subscriber unit, a frame count assigned to the subscriber unit, and a slot count assigned to the subscriber unit.

3. A subscriber unit which communicates with an intermediate communication unit of a communication system for authenticating the subscriber unit, comprising:

(a) input means for obtaining at least part of a plurality of dialed digits which uniquely identifies a target communication unit;

(b) processor means for generating an authentication message as a function of the at least part of the plurality of dialed digits; and (c) transmitter means for transmitting the authentication message and the at least part of the plurality of dialed digits to the intermediate communication unit.

4. The subscriber unit of claim 3:

(a) further comprising memory means for providing an identification number; and (b) wherein the processor means comprises means for generating the authentication message further as a function of the identification number.

5. The subscriber unit of claim 3 wherein the processor means composes means for generating the authentication message further as a function of a random number known to the subscriber unit.

6. The subscriber unit of claim 3 wherein the transmitter means transmits the authentication message during a communication session on a communication medium selected from the group consisting essentially of a radio communication link, satellite link, fiber optic cable, coaxial cable, and wireline.

7. A subscriber unit which communicates with an intermediate communication unit of a communication system for authenticating the subscriber unit, comprising:

(a) input means for obtaining at least part of a plurality of information bits which uniquely identifies a target communication unit;

(b) processor means for generating an authentication message as a function of the at least part of the plurality of information bits; and (c) transmitter means for transmitting the authentication message and the at least part of the plurality of information bits to the intermediate communication unit.

8. The subscriber unit of claim 7:

(a) further comprising memory means for providing an identification number; and (b) wherein the processor means comprises means for generating the authentication message further as a function of the identification number.

9. The subscriber unit of claim 7 wherein the processor means comprises means for generating the authentication message further as a function of a random number known to the subscriber unit.

10. The subscriber unit of claim 7 wherein the transmitter means transmits the authentication message during a communication session on a communication medium selected from the group consisting essentially of a radio communication link, satellite link, fiber optic cable, coaxial cable, and wireline.

11. An intermediate communication unit which authenticates a subscriber unit of a communication system, comprising:

(a) receiver means for receiving an authentication message and at least part of a plurality of information bits which uniquely identify a target communication unit, the authentication message being derived from the received information bits; and (b) processor means for determining, through the use of the received authentication message and the received information bits, whether a received service request is authentic.

12. The intermediate communication unit of claim 11:

(a) further comprising memory means for providing information regarding an identification number; and (b) wherein the processor means for determining whether the received service request is authentic further utilizes the information regarding the identification number.

13. The intermediate communication unit of claim 11 wherein the received authentication message is further derived from a random number known to the intermediate communication unit.

14. The intermediate communication unit of claim 11 wherein the receiver means receives the authentication message during a communication session on a communication medium selected from the group consisting essentially of a radio communication link, satellite link, fiber optic cable, coaxial cable, and wireline.

15. The intermediate communication unit of claim 11 wherein the processor means further comprises:

(a) means for granting communication between the subscriber unit and the target communication unit uniquely identified by the received information bits, if the received authentication message was substantially derived from the received information bits; and (b) means for providing output indicating that a multiple user is attempting to access the communication system, if the received authentication message was not substantially derived from the received information bits.

16. A method of authentication between a subscriber unit and a communication unit of a communication system, comprising:

(a) maintaining a non-arbitrary value which is a count of occurrences of a communication event in the subscriber unit;

(b) generating an authentication message in the subscriber unit as a function of at least part of the non-arbitrary value; and (c) transmitting the authentication message to the communication unit.

17. The method of claim 16 wherein the non-arbitrary value comprises a record of pseudo random communication events associated with the subscriber unit selected from the group consisting essentially of the number of telephone calls attributed to the subscriber unit, the number of channel handoffs attributed to the subscriber unit, a frame count assigned to the subscriber unit, and a slot count assigned to the subscriber unit.

18. A method of authentication between a subscriber unit and a communication unit of a communication system, comprising:

(a) receiving an authentication message at the communication unit;

(b) maintaining a non-arbitrary value which is a count of occurrences of a communication event in the communication unit; and (c) determining in the communication unit, through the use of the received authentication message and the maintained non-arbitrary value, whether a received service request is authentic.

19. The method of claim 18 wherein the non-arbitrary value comprises a record of pseudo random communication events associated with the subscriber unit selected from the group consisting essentially of the number of telephone calls attributed to the subscriber unit, the number of channel handoffs attributed to the subscriber unit, a frame count assigned to the subscriber unit, and a slot count assigned to the subscriber unit.

20. A method of authenticating a subscriber unit in a communication system, comprising:

(a) providing the subscriber unit with at least part of a plurality of digits which uniquely identify a target communication unit;

(b) generating an authentication message in the subscriber unit as a function of the at least part of the plurality of digits; and (c) transmitting the authentication message and the at least part of the plurality of digits from the subscriber unit to an intermediate communication unit.

21. The method of claim 20 wherein:

(a) the subscriber unit is provided with an identification number; and (b) the authentication message is generated in the subscriber unit further as a function of the identification number.

22. The method of claim 20 wherein the authentication message is generated in the subscriber unit further as a function of a random number known to the subscriber unit.

23. The method of claim 20 wherein the authentication message is transmitted during a communication session on a communication medium selected from the group consisting essentially of a radio communication link, satellite link, fiber optic cable, coaxial cable, and wireline.

24. A method of authenticating a subscriber unit in a communication system, comprising:

(a) receiving in an intermediate communication unit an authentication message and at least part of a plurality of digits which uniquely identifies a target communication unit, the authentication message being derived from the received digits; and (b) determining in the intermediate communication unit, through the use of the received authentication message and the received digits, whether a received service request is authentic.

25. The method of claim 24 wherein:

(a) the intermediate communication unit is provided with information regarding an identification number; and (b) the determination in the intermediate communication unit of whether a received service request is authentic further occurs through the use of the information regarding the identification number.

26. The method of claim 24 wherein the authentication message is further derived from a random number known to the intermediate communication unit.

27. The method of claim 24 wherein the authentication message is received during a communication session on a communication medium selected from the group consisting essentially of a radio communication link, satellite link, fiber optic cable, coaxial cable, and wireline.

28. The method of claim 24 wherein the step of determining further comprises:

(a) granting communication between the subscriber unit and the target communication unit uniquely identified by the received dialed digits, if the received authentication message was substantially derived from the received dialed digits; and (b) providing output indicating thin a multiple user is attempting to access the communication system, if the received authentication message was not substantially derived from the received digits.

29. A method of authenticating a subscriber unit in a communication system, comprising:

(a) providing the subscriber unit with at least part of a plurality of information bits which uniquely identify a target communication unit;

(b) generating an authentication message in the subscriber unit as a function of the at least part of the plurality of information bits; and (c) transmitting the authentication message and the at least part of the plurality of information bits from the subscriber unit to the communication system.

30. The method of claim 29 wherein:

(a) the subscriber unit is provided with an identification number; and (b) the authentication message is generated in the subscriber unit further as a function of the identification number.

31. The method of claim 29 wherein the authentication message is generated in the subscriber unit further as a function of a random number known to the subscriber unit.

32. The method of claim 29 wherein the authentication message is transmitted during a communication session on a communication medium selected from the group consisting essentially of a radio communication link, satellite link, fiber optic cable, coaxial cable, and wireline.

33. A method of authenticating a subscriber unit in a communication system, comprising:

(a) receiving in an intermediate communication unit an authentication message and at least part of a plurality of information bits which uniquely identifies a target communication unit, the authentication message being derived from the received information bits; and (b) determining in the intermediate communication unit, through the use of the received authentication message and the received at least part of the plurality of information bits, whether a received service request is authentic.

34. The method of claim 33 wherein:

(a) the intermediate communication unit is provided with information regarding an identification number; and (b) the determination in the intermediate communication unit of whether a received service request is authentic further occurs through the use of the information regarding the identification number.

35. The method of claim 33 wherein the authentication message is further derived from a random number known to the intermediate communication unit.

36. The method of claim 33 wherein the authentication message is received during a communication session on a communication medium selected from the group consisting essentially of a radio communication link, satellite link, fiber optic cable, coaxial cable, and wireline.

37. The method of claim 33 wherein the step of determining further comprises:

(a) granting communication between the subscriber unit and the target communication unit uniquely identified by the received information bits, if the received authentication message was substantially derived from the received information bits; and (b) providing output indicating that a multiple user is attempting to access the communication system, if the received authentication message was not substantially derived from the received digits.

38. A subscriber unit which authenticates communications with a communication unit of a communication system, comprising:

(a) memory means for maintaining a non-arbitrary value which is a count of occurrences of a communication event;

(b) processor means for generating an authentication message as a function of at least part of the non-arbitrary value; and (c) transmitter means for transmitting the authentication message to the communication unit.

39. The subscriber unit of claim 38 wherein the non-arbitrary value comprises a record of pseudo random communication events associated with the subscriber unit selected from the group consisting essentially of the number of telephone calls attributed to the subscriber unit, the number of channel handoffs attributed to the subscriber unit, a frame count assigned to the subscriber unit, and a slot count assigned to the subscriber unit.

40. An intermediate communication unit which authenticates a subscriber unit of a communication system, comprising:

(a) a receiver unit receiving an authentication message and at least part of a plurality of dialed digits which uniquely identify a target communication unit, the authentication message being derived from the received dialed digits; and (b) a processor determining, through the use of the received authentication message and the received dialed digits, whether a received service request is authentic.

41. The intermediate communication unit of claim 40:

(a) further comprising memory means for providing information regarding an identification number; and (b) wherein the processor determining whether the received service request is authentic further utilizes the information regarding the identification number.

42. The intermediate communication unit of claim 40 wherein the received authentication message is further derived from a random number known to the communication unit.

43. The intermediate communication unit of claim 40 wherein the receiver unit receives the authentication message during a communication session on a communication medium selected from the group consisting essentially of a radio communication link, satellite link, fiber optic cable, coaxial cable, and wireline.

44. The intermediate communication unit of claim 40 wherein the processor further comprises:

(a) means for granting communication between the subscriber unit and the target communication unit uniquely identified by the received dialed digits, if the received authentication message was substantially derived from the received dialed digits; and (b) means for providing output indicating that a multiple user is attempting to access the communication system, if the received authentication message was not substantially derived from the received dialed digits.

* * * * *

UNITED STATES PATENT AND TRADEMARK OFFICE
CERTIFICATE OF CORRECTION

PATENT NO. : 5,572,193
DATED : November 5, 1996
INVENTOR(S) : Flanders, et al.

It is certified that error appears in the above-indentified patent and that said Letters Patent is hereby corrected as shown below:

Column 10, Line 8 reads "indicating thin" should be --indicating that--.

Signed and Sealed this

Twenty-second Day of April, 1997

Attest:

BRUCE LEHMAN

Attesting Officer

*Commissioner of Patents and Trademarks*